United States Patent [19]

Whetten

[11] Patent Number: 4,719,354

[45] Date of Patent: Jan. 12, 1988

[54] HIGH EFFICIENCY DETECTOR FOR ENERGETIC X-RAYS

[75] Inventor: Nathan R. Whetten, Ballston Lake, N.Y.

[73] Assignee: General Electric Company, Schenectady, N.Y.

[21] Appl. No.: 839,481

[22] Filed: Mar. 14, 1986

[51] Int. Cl.$^4$ .............................................. G01T 1/18
[52] U.S. Cl. ..................................... 250/385; 250/374
[58] Field of Search ................................ 250/374, 385

[56] References Cited

U.S. PATENT DOCUMENTS

| | | | |
|---|---|---|---|
| 3,898,465 | 8/1975 | Zaklad et al. | 250/389 |
| 4,031,396 | 6/1977 | Whetten et al. | 250/385 |
| 4,376,893 | 3/1983 | Whetten | 250/374 |
| 4,394,578 | 7/1983 | Houston et al. | 250/374 |
| 4,500,785 | 2/1985 | Whetten et al. | 250/385 |

FOREIGN PATENT DOCUMENTS 0063705 11/1982 European Pat. Off.
2302587 9/1976 France.

OTHER PUBLICATIONS

"Recent Developments in High-Resolution Noble Liquid Counters" by University of Cal. Radiation Lab. Report No. UCRL-20118, Sep. 1970.

"Particle Detectors Based on Noble Liquids" by Muller et al., University of Cal. Radiation Lab. Report No. UCRL-20135, Sep. 1970.

"Liquid-Filled Proportional Counter" by Muller et al., Physical Review Letters, vol. 27, No. 8, Aug. 23, 1971.

"Test of a Liquid Argon Chamber with 20 μm RMS Resolution" by Derenzo et al., Nuclear Instruments and Methods No. 122, pp. 319-327, 1974.

Primary Examiner—Janice A. Howell
Attorney, Agent, or Firm—Marvin Snyder; James C. Davis, Jr.

[57] ABSTRACT

An x-ray detector for use in computerized tomography employing a liquefied xenon as a high density detecting medium comprises a housing having an x-ray permeable window and containing at least one electrically conductive voltage plate spaced from, and parallel to, at least one collector plate comprising a plurality of conductive elements. The liquid xenon fills the space between the voltage and collector plates.

32 Claims, 14 Drawing Figures

HIGH EFFICIENCY DETECTOR FOR ENERGETIC X-RAYS

The present invention relates in general to apparatus for detecting x-rays, and, more specifically, to a high efficiency detector of energetic x-rays used in computerized tomography systems.

RELATED APPLICATIONS

This invention is related to the invention described and claimed in Whetten application Ser. No. 839,480 filed concurrently herewith and assigned to the instant assignee.

BACKGROUND OF THE INVENTION

Presently, x-ray detectors in computerized tomography find use in both medical and industrial applications. In such applications, it is highly desirable for the detector to have a high operating efficiency. The efficiency of the detector is determined primarily by the percentage of incident x-ray energy that is detected. Detector efficiency may be improved by increasing the density of the detecting medium. As density of the detecting medium is increased, incident x-ray energy is absorbed in a shorter distance of propagation through the medium. In present medical and industrial detectors, x-ray energy is detected on the basis of its interaction with a gaseous detecting medium. The interaction produces electrons and positive ions which propagate between the proximate voltage and collector plates under the influence of an electric field applied therebetween. The electrons or positive ions, depending on the direction of the electric field, detected at the collector plates provide the information from which a computerized tomography image is constructed. Thus, detector efficiency is maximized when all of the electrons and positive ions liberated by the incident x-ray energy are detected. However, a portion of incident x-ray energy not immediately interacting in the gaseous detecting medium may be lost by being absorbed in traversing the plate structure within the detector. For example, in a preferred embodiment of the x-ray detector for medical computerized tomography described in commonly assigned U.S. Pat. No. 4,031,396 to Whetten et al., a plurality of voltage and collector plates comprising high molecular weight material such as tungsten are disposed radially with respect to the incident x-ray beam. X-ray energy incident on these tungsten plates is absorbed without interacting with the detecting medium to liberate electrons and ions, and thus detector efficiency is less than maximum. If density of the detecting medium in such a detector is increased, the absorption length of the incident x-rays will be shortened and a greater percentage of the incident x-rays will interact with the medium before striking and being absorbed by the plates. Further, the shorter absorption length of the incident x-rays permits construction of a detector with shorter collector plates. As a result, the plates present a smaller plate surface area capable of absorbing incident x-rays.

Increasing the detecting medium density also has the beneficial effect of decreasing the absorption length of fluorescent x-rays. The atoms of a gaseous detecting medium, upon interacting with the incident x-ray energy, may themselves emit low energy x-ray photons. When the detecting medium allows a long absorption length for a fluorescent x-ray photon, the photon thus generated by secondary emission may be detected within the detector at a location remote from the point where the incident x-ray entered the detector. Such event degrades spatial resolution and decreases detector efficiency since a portion of the incident x-ray energy is not usefully detected.

One solution known in the art to the fluorescent x-ray secondary emission problem is to use collector and voltage plates comprising a high atomic weight material, such as tungsten, as described in the above-cited patent. The plates absorb the fluorescent x-rays before they travel any significant distance within the detector. This technique results in absorption of the fluorescent x-rays by the plates, thereby avoiding the aforementioned degradation of spatial resolution caused by the fluorescent x-rays; however, detection of that portion of the incident x-ray energy responsible for the fluorescent x-rays is precluded and thus detector efficiency is decreased. Since fluorescent x-rays have an absorption length that is inversely proportional to density of the detecting medium, a solution to this dilemma is to increase the medium density. Moreover, using a detecting medium density selected to provide a fluorescent x-ray absorption length on the same order of magnitude as the spacing of the individual collector plates within the detector avoids need for the voltage and collector plates to be of an absorptive character. Thus, the fluorescent x-rays can be detected in close spatial proximity to the point where the incident x-ray enters the detector. As a result, efficiency of the detector is enhanced.

Both the medical and industrial x-ray detectors known in the art utilize high atomic weight noble gases, such as xenon or argon, as a detecting medium. In such case, a density increase is accomplished by increasing the gas pressure. The increased gas pressure, however, requires a more massive detector housing so as to be structurally capable of reliably withstanding the higher gas pressure. The medical x-ray detector disclosed in the above-noted U.S. Pat. No. 4,031,396 employs gaseous xenon at a pressure in the range of 10 to 50 atmospheres. A typical operating pressure of 25 atmospheres corresponds to a gaseous xenon density of approximately 0.16 grams per cubic centimeter. An increase in gas pressure of the detecting medium beyond 75 to 80 atmospheres would necessitate a redesign of the detector housing in order to enable containment of the higher pressure gas. Industrial detectors, such as the one described in U.S. Pat. No. 4,394,578, may employ detecting medium gas pressures of up to 200 atmospheres. At such pressures, one might assume that the detecting medium density is high enough to avoid degradation of detector efficiency by detecting fluorescent x-rays at a point remote from where the incident x-ray enters the detector. However, x-rays utilized in industrial tomography are typically far more energetic than those in medical tomography, and thus have significant absorption lengths even in a very high pressure gaseous medium. Further, as seen in the abovenoted patent, the industrial detector requires considerable structural enhancement of the housing to reliably contain the higher pressure gas. Such high pressures, moreover, result in decreased propagation speed of the electrons and positive ions being detected, causing an increase in response time of the detector, defined as the time required for all charged particles (i.e. electrons and positive ions) attributable to a particular incident x-ray beam to be cleared from the detecting medium.

OBJECTS OF THE INVENTION

It is a principal object of the present invention to provide an industrial computerized tomography x-ray detector which exhibits high efficiency.

Another object of the present invention is to provide an x-ray detector exhibiting both high resolution and high efficiency without need for a housing structurally capable of containing a gas detecting medium at ultra-high pressures.

A further object of the present invention is to provide an x-ray detector having high efficiency without excessive detector response time.

An additional object of the present invention is to provide an x-ray detector in which fluorescent x-rays are absorbed before traveling any significant distance within the detector.

Yet another object of the present invention is to provide an x-ray detector in which fluorescent x-rays are absorbed without requiring increased detector response time.

SUMMARY OF THE INVENTION

The foregoing objects of the present invention are achieved by means of a new and improved x-ray detector having high spatial resolution, and without use of an ultra-high pressure gaseous detecting medium. The detector comprises a housing having an x-ray permeable window and containing (1) at least one electrically conductive voltage plate, (2) at least one collector plate comprising a plurality of side-by-side conductive elements, and (3) a detecting medium comprising a liquefied noble gas, such as xenon, occupying the space between the voltage and collector plates.

Upon establishing an electric field between the voltage and collector plates, x-ray energy entering the housing through the window excites the liquid medium to cause conduction by transport of holes and electrons between the voltage plate and the most proximate collector plate element, where they are sensed to signal the incident of x-ray energy pursuant to generation of the computerized tomography image.

BRIEF DESCRIPTION OF THE DRAWING

FIG. 13b is a perspective view, partially broken away, of a collector plate structure used in the embodiment of FIG. 13a.

DETAILED DESCRIPTION OF THE INVENTION

The use of liquefied noble gases and particle detectors has been studied. In particular, it has been found that both liquefied argon and liquefied xenon are substantially opaque to electromagnetic radiation at x-ray frequencies and may serve as detecting media in particle counters. Such particle counters have been constructed using both fine wire and sharp point electrodes, as reported by Derenzo et al. in the University of California Radiation Laboratory Report No. UCRL-20118 entitled "Recent Developments in High-Resolution Noble Liquid Counters" dated September, 1970. In that report, it was observed that the rise times of avalanche pulses induced in such detectors under x-ray bombardment were on the order of 5 to 10 microseconds for argon and less than 5 nanoseconds for xenon. The faster rise time for liquefied xenon was also reported by Derenzo et al. in the University of California Radiation Laboratory Report No. UCRL-20135 entitled "Particle Detector Based on Noble Liquids" dated September, 1970. In that report, the authors conclude that the faster pulse rise time of liquid xenon is due to a conduction mechanism by transport of electrons and holes rather than electrons and ions.

The nature of the conduction mechanism in liquid xenon can be utilized advantageously in an x-ray tomography detector to provide the detector with a significantly faster response time, or time required for all charged particles (electrons and holes in the liquid xenon) attributable to a particular incident x-ray beam to be removed from the detecting medium, than is possible with other detecting media having comparable densities.

Figure 1:
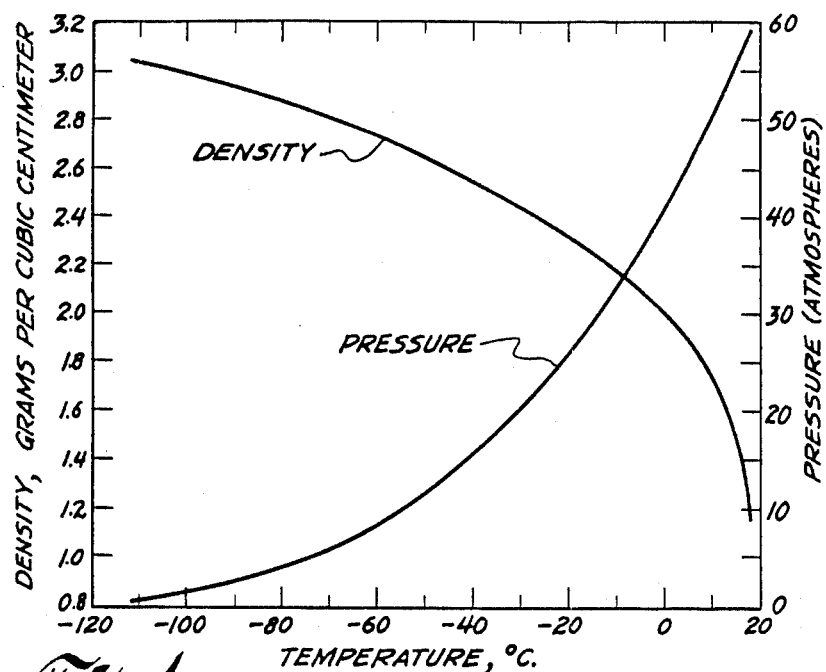
FIG. 1 is a graphical illustration of the pressure and density properties of liquid xenon over a range of temperatures.

As evident in FIG. 1, xenon can be liquefied at its critical point of 16.6° C. and 58 atmospheres, thereupon exhibiting a density of approximately 1.1 grams per cubic centimeter. The liquid xenon density increases as its temperature is reduced. Liquid xenon density at 0° C. is 1.99 grams per cubic centimeter, while at −109° C. the density increases to 3.06 grams per cubic centimeter. The vapor pressures of liquid xenon corresponding to these two temperatures are 41 atmospheres and 1 atmosphere, respectively. With such properties, an x-ray detector utilizing liquid xenon as its detecting medium exhibits the desirable characteristics of high efficiency and fast response time. It is estimated that the liquid xenon detector of the present invention has a response time on the same order of magnitude as that of the above-noted prior art medical detector (U.S. Pat. No. 4,031,396) while also being capable of providing a detecting medium density more than ten times greater. The industrial detector of U.S. Pat. No. 4,394,578 achieves a detecting medium density of approximately 2.5 grams per cubic centimeter at the upper end (200 atmospheres) of its operating pressure range but requires a correspondingly longer response time. Additionally, such industrial detector must include a housing having the structural capability to contain the ultra-high gas pressure involved. The detector of the present invention can achieve a like detecting medium density at a much lower pressure so as not to require all the requisite high pressure housing structural enhancements, and without the longer response times.

Figure 2:
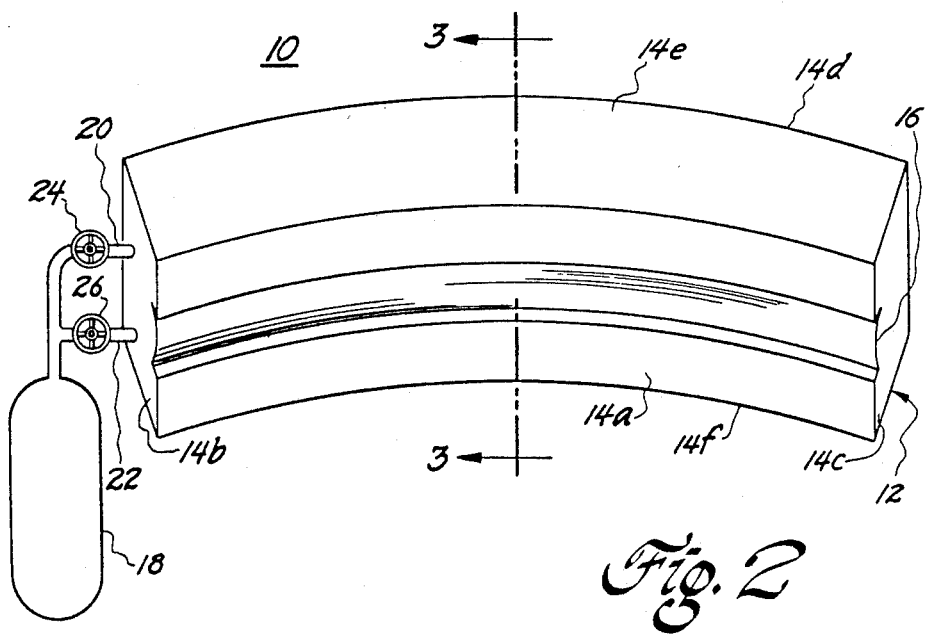
FIG. 2 is a perspective view of an x-ray detector constructed in accordance with the present invention.
Figure 3:
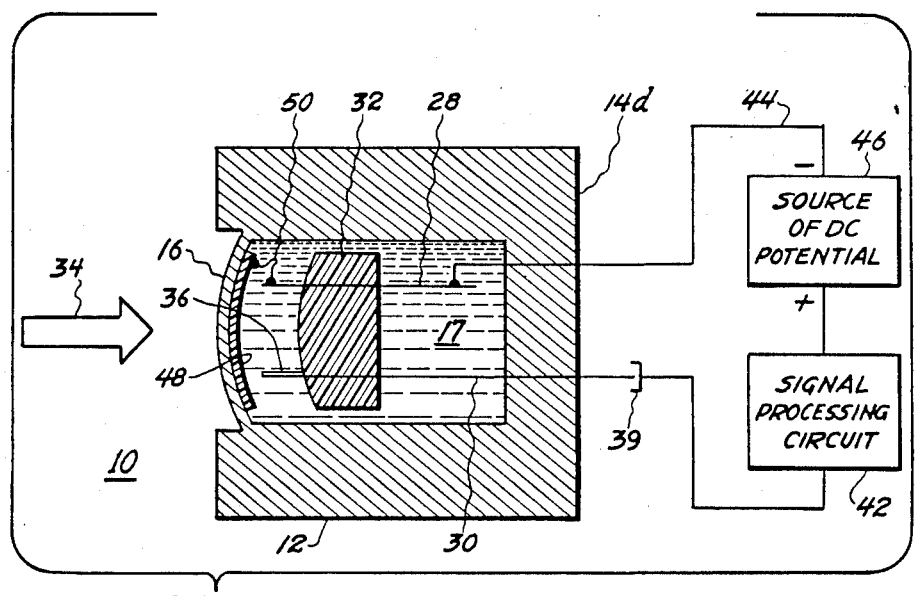
FIG. 3 is a vertical sectional view taken along line 3—3 in FIG. 2 illustrating one embodiment of the present invention and schematically illustrating its connections to operational electronic circuits.

An x-ray detector constructed according to the instant invention is shown in FIG. 2. The detector 10 includes a housing 12 having a front wall 14a. The housing, as viewed in FIG. 2, further includes two side walls 14b and 14c, a back wall 14d a top 14e and a bottom 14f. It should be noted that the above wall designations of the housing structure are only relative terms chosen to describe their spatial relationship for the particular housing orientation shown in FIG. 2. In the preferred embodiment of the invention, housing 12 is constructed of a low atomic weight, x-ray permeable sheet stock, such as aluminum. When using aluminum stock, the housing wall thickness may be, for example, $\frac{1}{4}$ to $\frac{1}{2}$ inch. Located in front wall 14a is an x-ray permeable window 16. The window may also be constructed of aluminum having a uniform thickness of, for example, approximately $\frac{1}{8}$ inch. The overall housing, oriented as in FIG. 2 and viewed from the top, is contoured as an annular section. As shown in FIG. 3, window 16 is formed with a cylindrical curvature (concavoconvex) in transverse cross section. The cylindrical curvature, together with the internal pressure of the detecting medium contained within the housing, results in the window being in tension, thereby maximizing its strength against the pressure exerted by the detecting medium. The housing itself requires no special reinforcing members and has a pressure retaining capability on the order of 80 atmospheres, which is substantially the same as that of the housing of the medical detector of the above-noted U.S. Pat. No. 4,031,396.

In FIG. 2, a xenon reservoir tank 18 is shown coupled to housing 12 through side wall 14b by a main pipeline 20 and a relief pipeline 22. Pipeline 20 includes a main valve 24 while pipeline 22 includes a housing pressure relief valve 26 which bleeds xenon from the housing into the tank in the event that xenon pressure in the housing rises to above a safe level. The detector housing, pipelines and reservoir tank all have the structural capability to retain a noble gas or liquid at a pressure of up to approximately 80 atmospheres.

Means for cooling gaseous xenon to the temperature at which it assumes its liquid state are not shown. Such means, as known in the art, may comprise a refrigeration unit with refrigeration coils (not shown) coupled in thermal transfer relation with housing 12. For efficient thermal operation, a layer of insulating material may be installed over the coils surrounding the housing.

Prior to operation of the detector, main valve 24 is opened and gaseous xenon flows into housing 12 until both the housing and reservoir tank 18 contain, in common, gaseous xenon at a room temperature pressure of up to 80 atmospheres. When detector housing 12 is filled with gaseous xenon, the refrigeration unit is turned on in order to lower the temperature of the xenon in the housing to a level at which the xenon gas liquefies.

Liquefaction of the xenon gas in the housing results in a corresponding decrease in its vapor pressure. Refrigeration coils are not applied to reservoir tank 18, and as a result, a pressure differential develops between the gaseous xenon in the reservoir tank and the liquefied xenon in housing 12. This pressure differential causes the gaseous xenon in the reservoir tank to flow through pipeline 20 to the detector housing where it is liquefied. By this flow, a sufficient inventory of liquid xenon is established in the housing.

The temperature to which the liquid xenon is reduced is determined by the density desired for the detecting medium. Thus, referring to FIG. 1, if a detecting medium density of greater than 3.0 grams per cubic centimeter is desired, the xenon temperature should be lowered to below $-100°$ C. A temperature of $0°$ C. will suffice should a liquid xenon density of 2.0 grams per cubic centimeter be considered adequate.

The internal volume of reservoir tank 18 is also determined by the liquid xenon density desired. Gaseous xenon at a pressure of 75 atmospheres at $25°$ C. has a density of approximately 1.5 grams per cubic centimeter. In the preferred embodiment of the invention, a liquid xenon density greater than 3.0 grams per cubic centimeter is desired. As a result, reservoir tank 18 should have an internal volume slightly greater than that of housing 12. This preferred liquid xenon density occurs at a relatively low pressure (less than 10 atmospheres) and substantially exceeds the density realized in the industrial detector of U.S. Pat. No. 4,394,578 at its upper end operating pressure of 200 atmospheres.

In accordance with the embodiment of the invention illustrated in FIG. 3, a voltage plate 28 and a collector plate 30 are positioned within housing 12 in substantially parallel relation to one another behind window 16. Plates 28 and 30 are mounted in a support block 32 extending substantially coextensively with the arcuate length of the plates to maintain the parallel separation between them. Plate 30 carries side-by-side conductive stripes 36 in front of block 32. Block 32 comprises a material having good electrical insulating qualities, such as a machinable ceramic. As shown, the plates are oriented so that an incident x-ray energy beam 34, entering housing 12 through window 16, passes between the plates and substantially parallel thereto to interact with a liquid xenon detecting medium 17 contained within housing 12.

Figure 4:
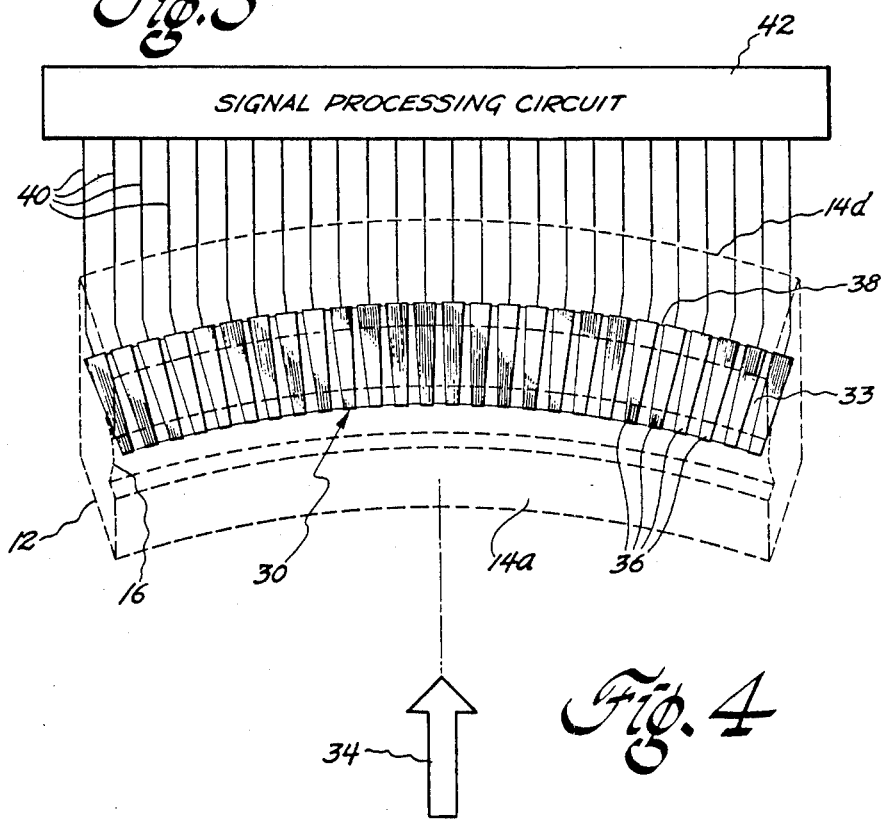
FIG. 4 is a perspective view of a collector plate utilized in the detector of FIG. 3, schematically illustrating its connections to a signal processing circuit.

FIG. 4 shows the position of collector plate 30 within housing 12, with voltage plate 28 and support block 32 omitted for clarity. Collector plate 30 comprises a rigid sheet of nonconductive material 33, such as fiberglass or epoxy, on which are disposed collector plate elements in the form of side-by-side conductive stripes 36. The stripes, disposed radially with respect to beam 34, are uniformly dimensioned and equidistantly spaced, each being slightly tapered in width from the back edge to the front edge of plate 30. The stripes may each comprise a coating of conductive material, such as aluminum or copper, disposed on the side of sheet 33 facing voltage plate 28. Voltage plate 28 has the same basic shape as that shown for collector plate 30 and may also comprise a rigid sheet of nonconductive material on which is disposed a continuous coating of a conductive material such as aluminum or copper. Both voltage plate 28 and collector plate 30 have an arcuate curvature conforming to the contour of the housing. In a preferred embodiment of the invention, plates 28 and 30 project forwardly (toward window 16) beyond block 32 approximately 100 mils and are separated from one another by approximately 1 inch. In medical computerized tomography applications, stripes 36 may each have an average width of 30 to 50 mils, the stripes being separated from one another by 2 to 3 mils. In industrial applications where greater spatial resolution is required and higher radiation dosages are typical, the number of stripes may be increased and their average widths decreased.

A rear portion 38 of collector plate 30 is extended through back wall 14d of housing 12, as shown in FIG. 4. An epoxy seal, not shown, is employed to seal the housing around the collector plate extension. Connecting means, such as an edge connector 39 (shown in FIG. 3) of the type used for making electrical connection to the edge of a circuit board, are provided along rear portion 38 for making individual connection from the stripes to input leads 40 which are connected to a signal processing circuit 42. As shown in FIG. 3, means such as a sealed cable feedthrough 44 in back wall 14d are provided for making electrical connection from voltage plate 28 to a source 46 of D.C. potential. Source 46 is also connected via circuit 42 to the collector plate stripes 36 in order that an electric field may be established between them and voltage plate 28.

Preferably, detector 10 further includes a window plate 48 comprising a sheet of conductive material as mounted on the inside surface of 16. Plate 48 may comprise a sheet of aluminized Mylar ® film with the Mylar plastic film side in contact with the inside surface of window 16 in order to electrically insulate the aluminized conductive side of plate 48 from window 16. Plate 48 is substantially transparent to x-ray energy. The aluminized side of plate 48 is electrically connected to voltage plate 28 by a jumper connection 50 to maintain the aluminized side at the potential of plate 28.

Figure 5:
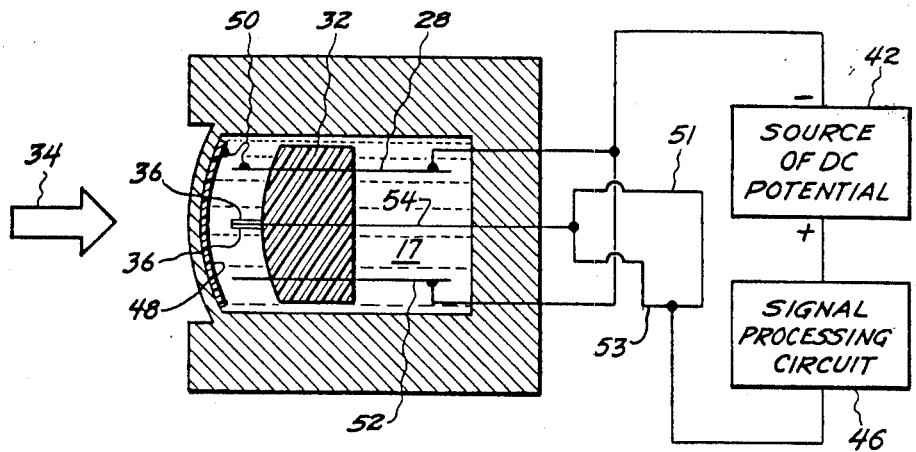
FIG. 5 is a vertical sectional view of a detector constructed in accordance with an alternative embodiment of the invention, schematically illustrating its connections to operational electronic circuitry.

The embodiment shown in FIG. 3 may be modified, as shown in FIG. 5, by including within housing 12 a second voltage plate 52 parallel to plate 28 and by replacing the previous collector plate with a collector plate 54 side-by-side conductive stripes 36 disposed on both of its sides. Voltage plates 28 and 52 are equidistantly spaced from, and parallel to, collector plate 54 situated therebetween. The stripes on the opposite sides of collector 54 may be separately connected to circuit 42 as previously accomplished by separate leads 40. However, in the preferred form of this embodiment, the corresponding pairs of stripes, respectively, on the opposite sides of collector 54 are electrically connected in parallel at their connection to circuit 42. For example, connections 51 and 53 are made to the two corresponding stripes of such pair, these connections then being parallel-connected at an input to circuit 42. Voltage plates 28 and 52 are electrically connected, in parallel, to source 46.

Figure 6:
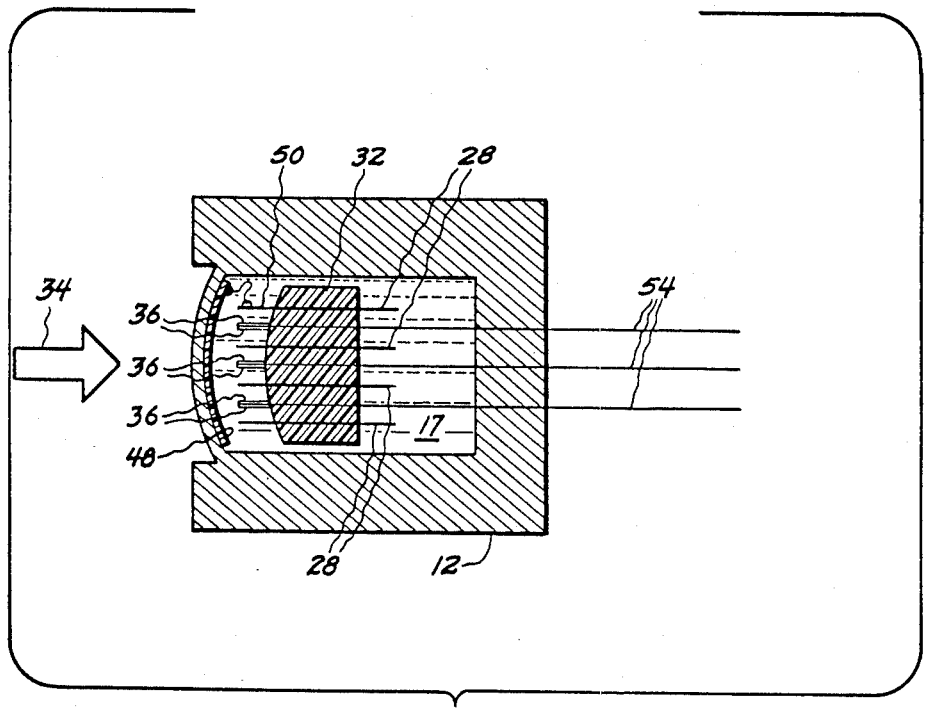
FIG. 6 is a vertical sectional view of a detector constructed in accordance with yet another embodiment of the present invention.

The embodiment of FIG. 3 may be further modified, as shown in FIG. 6, by disposing a plurality of parallel voltage plates 28 and collector plates 54 in alternating sequence within housing 12. The voltage and collector plates are equidistantly spaced from each other. In this embodiment, collector plates 54 with stripes 36 disposed on both sides are used. The individual stripes on the opposite sides of all collector plates 54 may be separately connected to a signal processing circuit (not shown) in a manner analogous to that illustrated in FIG. 5. However, in a preferred form of this embodiment, the corresponding pair of stripes, respectively, on each collector plate is aligned with corresponding pairs of stripes, respectively, on each of the other collector plates into a group, respectively, of collector stripes, each such group lying in a plane perpendicular to the plates. The stripes in each such group are electrically connected in parallel with one another and to the signal processing circuit. Voltage plates 28 are connected in parallel with one another to a DC source (not shown) which is also commonly connected to all of the stripes through the signal processing circuit. The latter electrical connections are also achieved in a manner analogous to that illustrated in FIG. 5.

Figure 7:
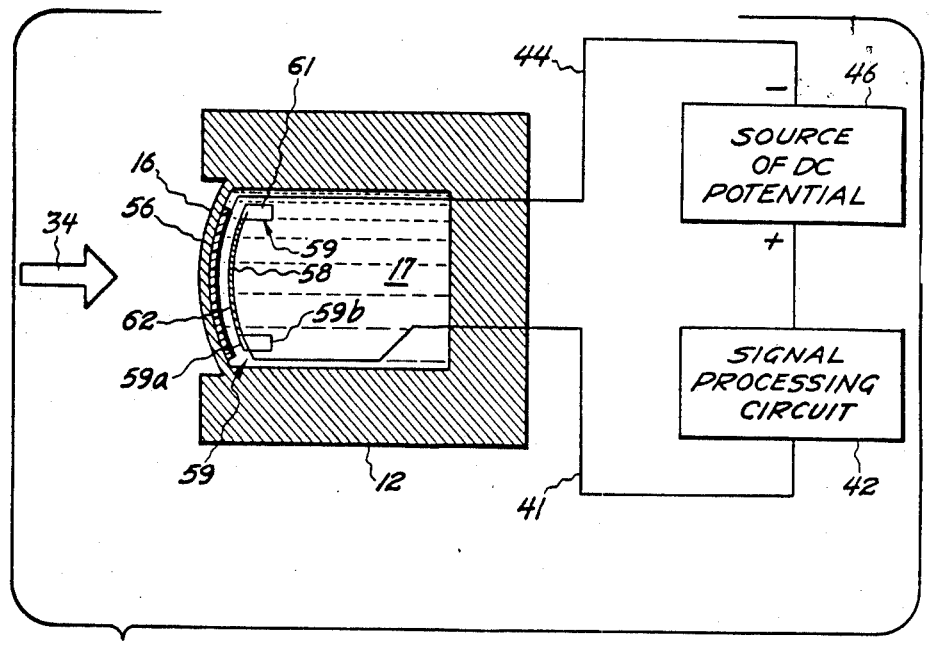
FIG. 7 is a vertical sectional view of another detector embodiment of the present invention, schematically illustrating its connections to operational electronic circuitry.
Figure 8:
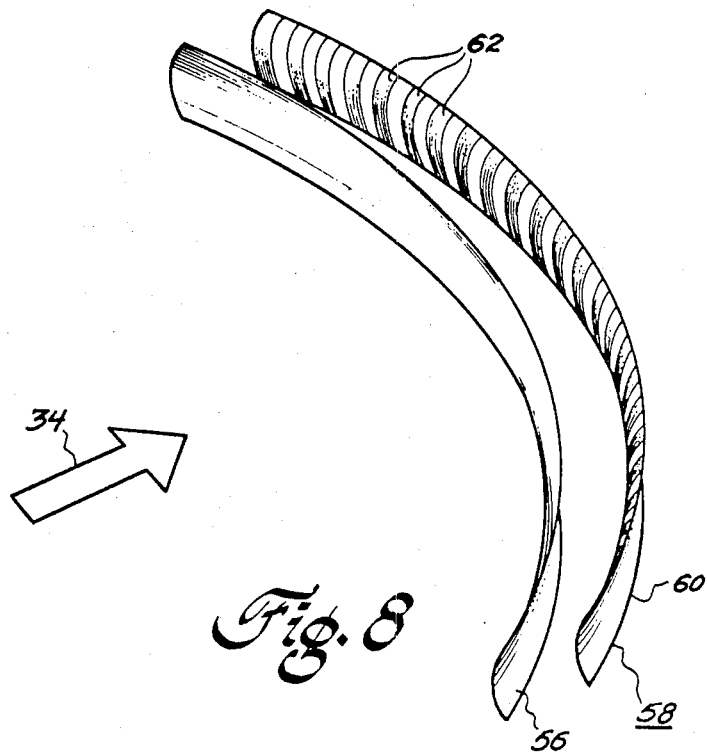
FIG. 8 is a perspective of the collector and voltage plates utilized in the detector embodiment shown in FIG. 7.

FIG. 7 illustrates a different embodiment of the invention wherein a voltage plate 56 is disposed on the inside surface of window 16 and a collector plate 58 is disposed parallel to, and spaced inwardly from, voltage plate 56. As in the embodiments of FIGS. 3 through 6, the voltage plate is substantially transparent to x-ray energy and may comprise a sheet of aluminized Mylar plastic film with the Mylar plastic film side contacting the window surface to electrically insulate the aluminized side from window 16. Collector plate 58 may be spaced approximately 100 mils from voltage plate 56. FIG. 8 illustrates the relative positions of the voltage and collector plates with housing 12 omitted for clarity. Collector plate 58 may comprise a rigid sheet of nonconductive material 60, such as fiberglass and epoxy, on which are disposed conductive collector elements as parallel, side-by-side equally-spaced stripes 62 of substantially uniform widths, e.g., 30 to 50 mils. In an industrial application, the number of stripes may be increased and the stripe width decreased. Each stripe 62 comprises a coating of conductive material, such as aluminum or copper, and is disposed on the side of sheet 60 facing voltage plate 56. Collector plate 58, in addition to having an arcuate contour conforming to that of the x-ray-receiving side of the housing, has a cylindrical curvature (concavoconvex) in cross section conforming to that of window 16, and is mounted along its two long edges in a pair of support blocks 59 and 61, as shown in FIG. 7. The support blocks are preferably comprised of a good electrical insulating material, such as a machinable ceramic.

In a preferred form of the embodiment of FIG. 7, portions 59a and 59b of support block 59 are fastened to collector plate 58 by an epoxy cement, so that the edge of the plate projects through. An edge connector, not shown, of the type previously described, is applied to the projecting edge of plate 58 in order to make separate electrical connections to stripes 62. These connections are brought through the rear of the housing by a cable 41 connected from the edge connector to signal processing circuit 42. Conductive means, such as solder, connects voltage plate 56 to lead 44 running to D.C. source 46.

Figure 9:
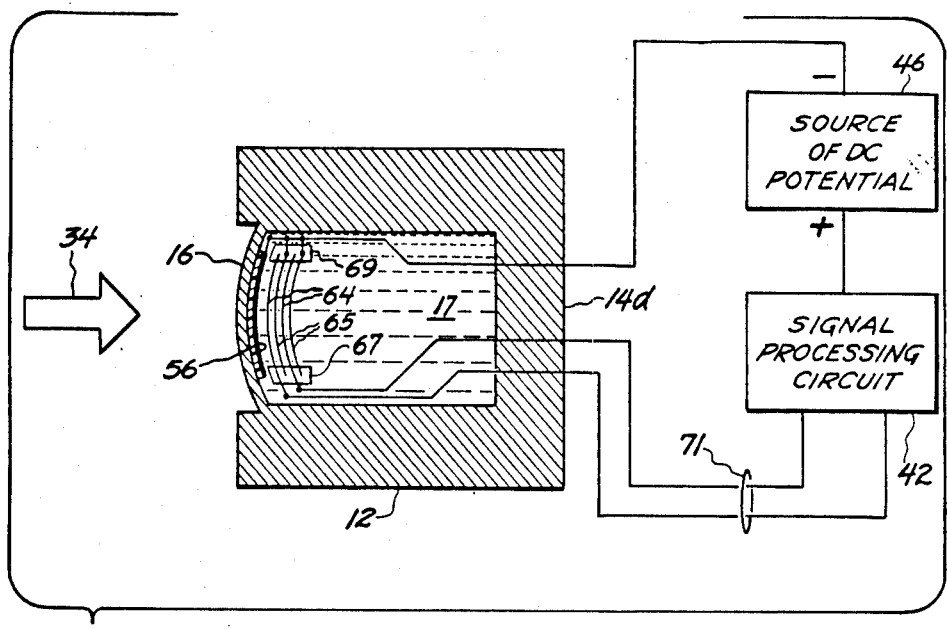
FIG. 9 is a vertical sectional view of yet another detector embodiment of the present invention, schematically illustrating its connections to operational electronic circuitry.
Figure 10:
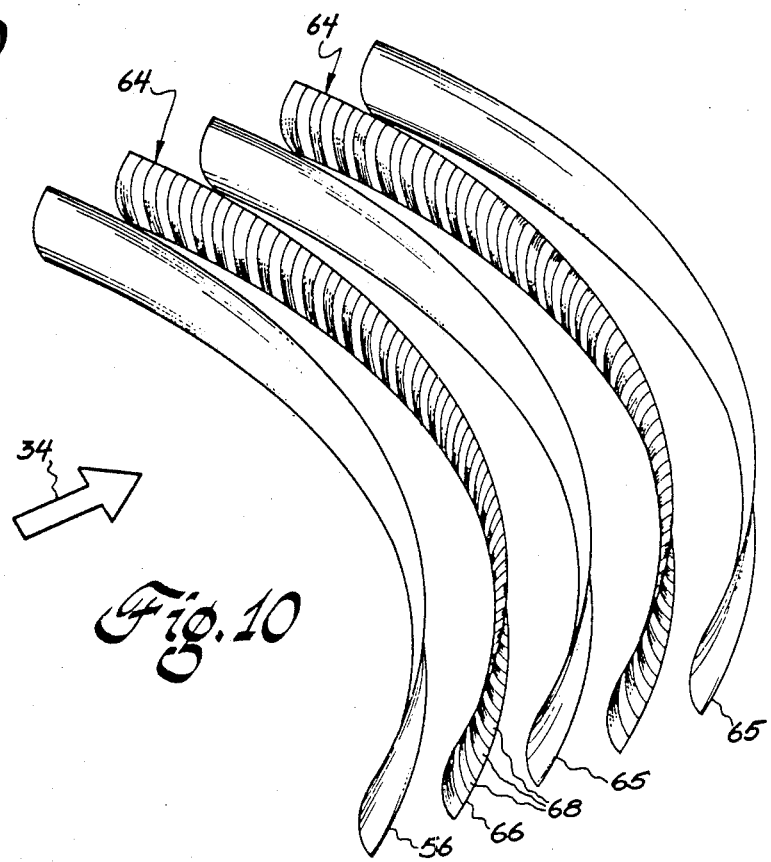
FIG. 10 is a perspective view illustrating the collector and voltage plates utilized in the detector embodiment of FIG. 9.

The embodiment shown in FIG. 7 may be modified as shown in FIG. 9 by positioning, within the housing, an alternating sequence of voltage and collector plates that are transparent to x-ray energy, equidistantly spaced from one another and from voltage plate 56. FIG. 10 illustrates the relative positions of the voltage and collector plates within the housing. Each collector plate 64 comprises a rigid sheet of nonconductive material 66, such as previously discussed, on both sides of which are disposed side-by-side conductive stripes 68 of a material substantially transparent to x-rays, such as aluminum. Each of voltage plates 65 comprises a rigid sheet of x-ray transparent nonconductive material on which is disposed a continuous coating of conductive material such as aluminum. Each of plates 64 and 65, in addition to having an arcuate contour conforming to that of the housing, also has a cylindrical curvature substantially similar in cross section to voltage plate 56 and window 16, as shown in FIG. 9. Plates 64 and 65 are mounted along their long edges in support blocks 67 and 69 which are comprised of a material having good electrical insulating characteristics, such as a machinable ceramic.

Voltage plates 65, accessed via holes in support block 69, are connected electrically in parallel with voltage plate 56 to source 46 by lead 44. The individual stripes (shown in FIG. 10) on the opposite sides of collector plates 64 may be separately connected to circuit 42. However, in a preferred form of this embodiment, the respective pairs of opposed stripes 68 on opposite sides of each collector plate are connected electrically in parallel and also in common as a group with the pairs of aligned stripes on the other collector plates, respectively, situated along the trajectory of incident x-ray beam 34. Electrical connections to stripes 68 are achieved in a manner similar to that described with respect to the embodiment shown in FIG. 7. Support block 67 may be divided into portions which are fastened, by epoxy cement, to collector plates 64 so that the edge of each of the collector plates projects through. An edge connector is applied to each collector plate projecting edge in order to make connections to stripes 68 (shown in FIG. 10). Connection between the edge connectors and signal processing circuit 42 may be accomplished by cables 71 passing through back wall 14d of the housing. All of the parallel connections are preferably made external to housing 12 at circuit 42.

Figure 11:
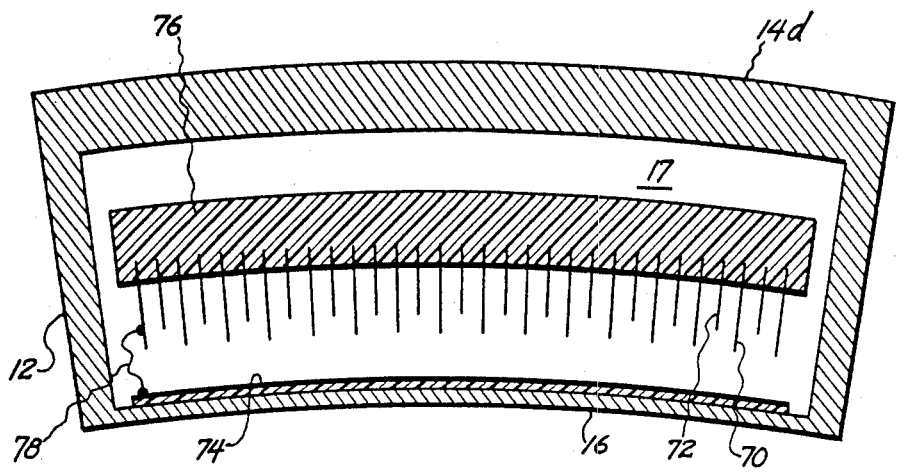
FIG. 11 is a cutaway top view of a detector constructed in accordance with still another embodiment of the present invention.
Figure 12:
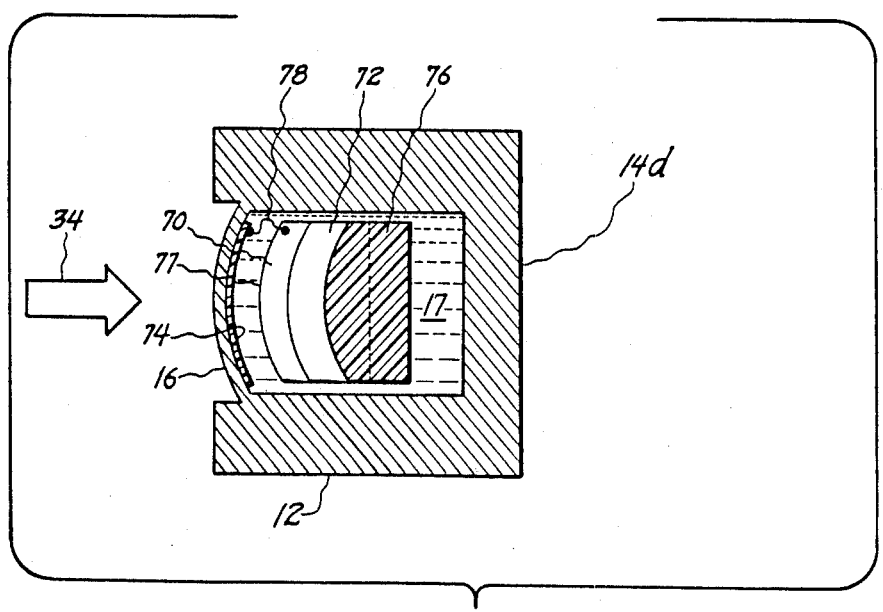
FIG. 12 is a vertical sectional view of the detector of FIG. 11.

FIGS. 11 and 12 illustrate yet another embodiment of the invention in which a plurality of voltage plates 70 are positioned in alternating relationship with a plurality of collector plate elements 72 from side to side of housing 12. The uniformly spaced voltage plates 70 and collector plate elements 72 each comprise a metal of high atomic number, such as tungsten, are positioned behind window 16, and are arrayed radially relative to the arcuate contour of housing 12. As in previous embodiments, a window plate 74 in the form of an aluminized Mylar plastic sheet is insulatively applied to the inside surface of window 16.

Voltage plates 70 and collector plate elements 72 are mounted in a support block 76 comprising a material having machinable ceramic. In a preferred form of this embodiment, collector plate elements 72 extend forwardly approximately 100 mils beyond block 76 and voltage plates 70 extend approximately 10 mils further beyond the collector plate elements. These plate extensions from support block 76 are shorter in length by comparison to those of the above-cited medical detector patent, with which applicant is familiar, in which the typical plate extension length is approximately 1 inch. As a result, the instant embodiment utilizing plates comprised of tungsten presents significantly less plate area to absorb x-ray energy and hence a correspondingly smaller percentage of both incident and fluorescent x-rays are absorbed by the plates. Thus, this embodiment of the present invention exhibits higher detector efficiency than the medical detector of the aforementioned patent.

The front edge 77 (FIG. 12) of each voltage plate 70 is contoured to substantially correspond to the curvature of window plate 74 on the inside surface of window 16. The front edge of each of collector plate elements 72 is likewise so contoured.

In a preferred form of this embodiment of the invention, voltage plates 70 are connected electrically in parallel with one another within the housing by connections (not shown). A single connection to the parallel-connected voltage plates is brought out through back wall 14d of the housing for making connection to a source of D.C. potential (not shown). Each of collector plate elements 72 is adapted to be connected to a separate wire connection, respectively, running to a signal processing circuit (not shown). An electrical jumper connection 78 is provided between window plate 74 and one of voltage plates 70 in order that plate 74 may be maintained at the same voltage potential as the voltage plates.

Figure 13A:
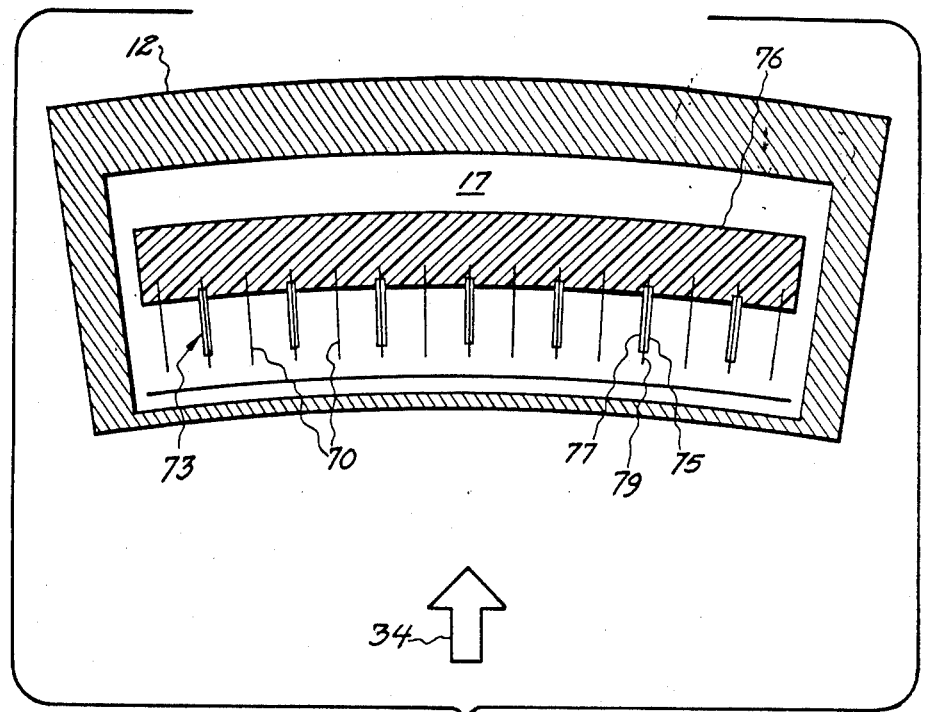
FIG. 13a is a cut-away top view of a detector constructed in accordance with still a further embodiment of the present invention.
Figure 13B:
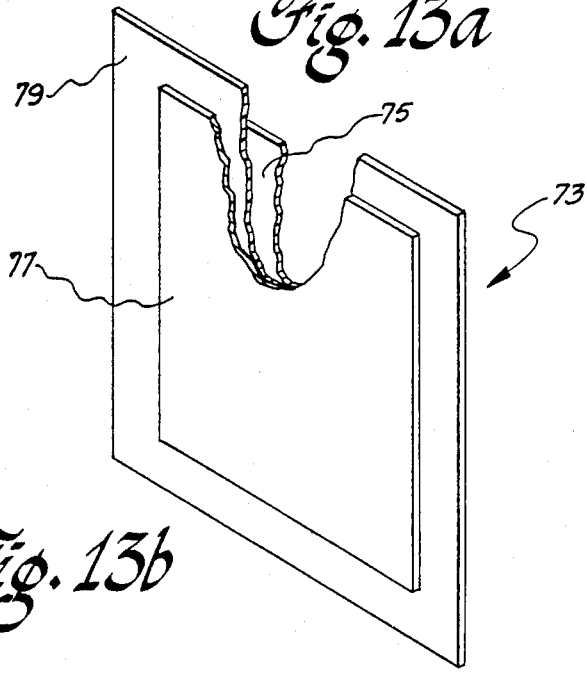

FIGS. 13a and 13b illustrate a modification of the embodiment shown in FIGS. 11 and 12, wherein a collector plate pair 73, respectively, comprising two such elements 75 and 77 electrically insulated from one another by an intervening insulating layer 79, replaces each individual collector plate element, respectively. In a detector with collector plate pairs 73 in place, the spacing between voltage plates 70 and collector plate pairs 73 is doubled and, consequently, the number of voltage plates halved, as compared with the form of this embodiment shown in FIG. 11.

Prior to operation of the invention, the detector housing is filled with liquid xenon in the manner previously described. Connections from the collector and voltage plates are respectively made to the signal processing circuit 42 and the D.C. voltage source 46, as shown in FIGS. 3, 5, 7 and 9, for example. As a result, an electric field is established between the voltage plates and window plate at one polarity and the collector plate elements at the opposite polarity. An x-ray energy beam enters the detector housing through its x-ray permeable window, and passes through the x-ray permeable window plate into the liquid xenon detecting medium. The x-ray energy interacts with the liquid xenon and, as a result, electrical conduction through the xenon occurs. Under influence of the electric field, electrical current passes between the most proximate voltage plate and collector plate element by transport of holes and electrons. For the polarity of the connections to D.C. source 46 as shown in FIG. 3, electrons will propagate to collector plate elements 36 while holes will propagate to voltage plate 28.

The window plate being energized to the same potential as the voltage plates results in an electric field being established in the detecting medium region proximate the window. As a result, x-ray energy that is absorbed in this region initiates the above-described current that is detected at the nearest collector plate element, enhancing detector efficiency. The magnitude of current in the various collector elements is measured by the signal processing circuit for use in forming the computerized tomography image.

The embodiments illustrated in FIGS. 3, 5, 6 and 12 include a window plate in order to enhance detector efficiency. However, a detector built in accordance with any of these embodiments, but with the window plate eliminated, would also function adequately because only the portion of x-ray energy interacting with the liquid xenon detecting medium immediately behind the housing window would run the possibility of not being sensed.

The parallel connection of opposed collector stripes on opposite surfaces of each collector plate and their common connection with aligned pairs of opposed stripes on the other collector plates is preferred herein. However, the stripes need not be so connected. For example, the collector stripes in the embodiment shown in FIG. 6 may be separately connected to the signal processing circuit. In addition to thereby achieving image resolution in a first (or horizontal) direction parallel to the collector plates, the current measurements compiled by the signal processing circuit would also enable image resolution in a second (or vertical) direction perpendicular to the first.

The collector stripes of the collector plates in the embodiment shown in FIGS. 9 and 10 may, alternatively, be separately connected to the signal processing circuit. As a result, information on the hardening of the x-ray spectrum may be compiled. For example, a patient undergoing examination with a medical computerized tomography x-ray detector may be exposed to an x-ray spectrum including a distribution of high and low energy x-rays. The collector at the front of the detector will detect the lower energy x-rays while the rearward collector plate detects higher energy x-rays. As a result, the propensity of body parts to absorb x-rays, as a function of x-ray energy level, may be studied, such information being of value in, for example, the treatment of tumors.

While only certain preferred features of the invention have been illustrated and described herein, many modifications and changes, in whole or in part, will occur to those skilled in the art. It is, therefore, to be understood that the appended claims are intended to cover all such modifications and changes as fall with the true the spirit and scope of the invention.

What is claimed is:

1. A high efficiency, computerized tomography x-ray detector, comprising:
   a housing having an x-ray permeable window therein;
   one voltage plate in the form of a sheet of electrically conductive material;
   a collector plate including an array of side-by-side discrete, electrically conductive collector plate elements; and
   a liquefied noble gas contained within said housing, said liquefied noble gas being substantially opaque to electromagnetic radiation at x-ray frequencies;
   whereby x-ray energy entering said housing through said window in the presence of an electric field between said voltage plate and said collector plate elements excites said liquefied noble gas to achieve current conduction by transport of holes and electrons between each said voltage plate and the most proximate of said collector plate elements.

2. The x-ray detector of claim 1 wherein said liquefied noble gas consists essentially of xenon.

3. The x-ray detector of claim 2 wherein said liquefied xenon density is between 1.1 and 3.5 grams per cubic centimeter.

4. The x-ray detector of claim 1 including an x-ray permeable window sheet disposed proximate the inside surface of said window in electrically insulative relation thereto, said window sheet having a conductive surface confronting said voltage and collector plates;
   whereby x-ray energy entering said housing through said window in the presence of an electric field between said window sheet conductive surface and said collector plate elements excites the portion of said liquefied noble gas proximate said window to achieve current conduction by transport of holes and electrons between said window sheet and the most proximate of said collector plate elements.

5. The x-ray detector of claim 1 wherein said voltage plate and said collector plate are mounted in parallel relation such that an x-ray energy beam penetrating said housing window passes between said plates.

6. The x-ray detector of claim 5 wherein said collector plate comprises a sheet of nonconductive material on which said conductive collector plate elements are disposed as spaced, substantially parallel, collector stripes, said detector further including a signal processing circuit, and conductive means electrically coupling each of said collector stripes to said signal processing circuit.

7. The x-ray detector of claim 6 wherein said detector includes a second voltage plate mounted in spaced relation to said one voltage plate;
   said collector plate being disposed between said voltage plates; and
   said collector stripes being disposed on the opposite surfaces of said nonconductive sheet in facing relation with said voltage plates.

8. A high efficiency, computerized tomography x-ray detector, comprising:
   a housing having an x-ray permeable window therein;
   a plurality of voltage plates, each in the form of a sheet of electrically conductive material and mounted in spaced relation to each other;
   a plurality of collector plates positioned with respect to said voltage plates to achieve an alternating sequence of respectively spaced voltage and collector plates, each of side-by-side said collector plates including an array of side-by-side discrete, electrically conductive collector plate elements, respectively, on each surface thereof in facing relation with adjacent ones, respectively, of said voltage plates; and
   a liquefied noble gas contained within said housing, said liquefied noble gas being substantially opaque to electromagnetic radiation at x-ray frequencies;
   whereby x-ray energy entering said housing through said window in the presence of an electric field between each said voltage plate and the most proximate of said collector plate elements excites said liquefied noble gas to achieve current conduction by transport of holes and electrons between each said voltage plate and the most proximate of said collector plate elements.

9. The x-ray detector of claim 7 wherein said collector plate elements comprise spaced, substantially parallel stripes disposed on opposite surfaces of said nonconductive sheet, said stripes being respectively arranged in correspondingly opposed pairs separately connected to the signal processing circuit.

10. The x-ray detector of claim 8 wherein said collector plate elements disposed on opposite surfaces of each said nonconductive sheet are respectively arranged in pairs of correspondingly opposed collector stripes, said collector stripe pairs on said collector plates being aligned in collector stripe groups, each of said groups lying in a plane substantially perpendicular to said voltage and collector plates, the pairs in each group being electrically connected together for separate connection to the signal processing circuit.

11. The x-ray detector of claim 1 wherein said voltage plate is disposed on the surface of said window facing into said housing and said collector plate is mounted substantially parallel to and spaced from said voltage plate, said voltage plate being substantially transparent to x-ray energy.

12. The x-ray detector of claim 11 wherein said voltage plate includes an electrical insulating layer disposed on said sheet of electrically conductive material, said voltage plate being positioned such that said insulating layer is in contact with the surface of said window facing into said housing.

13. The x-ray detector of claim 11 wherein said collector plate comprises a sheet of nonconductive material on which said conductive collector plate elements are disposed as substantially parallel collector stripes, said detector further including means coupled to each of said collector stripes for making separate electrical connection, respectively, to a signal processing circuit.

14. The x-ray detector of claim 13 including:
a plurality of additional voltage plates disposed in spaced relation to said window;
a plurality of additional collector plates positioned with respect to said additional voltage plates to achieve an alternating sequence of substantially parallel, respectively spaced ones of said additional voltage plates and said additional collector plates;
said voltage plates and said collector plates each being substantially transparent to x-ray energy; and
said collector stripes being disposed on the opposite surfaces of each of said nonconductive sheets of each said collector plate in facing relation with the adjacent ones, respectively, of said additional voltage plates.

15. The x-ray detector of claim 14 wherein said collector stripes disposed on opposite surfaces of each said nonconductive sheet are respectively arranged in correspondingly opposed pairs, said collector stripe pairs on said collector plates being aligned in collector stripe groups along the trajectory of an x-ray energy beam penetrating said housing window, the collector stripe pairs in each group being electrically connected together for separate electrical connection to the signal processing circuit.

16. A high efficiency, computerized tomography x-ray detector, comprising:
a housing having an x-ray permeable window therein;
first and second voltage plates each in the form of a sheet of electrically conductive material substantially opaque to x-ray energy;
a collector plate including an array of side-by-side discrete, electrically conductive collector plate elements substantially opaque to x-ray energy;
said voltage plates and said collector plate mounted in opposed relation within said housing in locations behind said window and positioned perpendicular to said window in alternating relationship;
a liquefied noble gas contained within said housing, said liquefied noble gas being substantially opaque to electromagnetic radiation at x-ray frequencies;
whereby x-ray energy entering said housing through said window passes between said voltage plates and said collector plate elements.

17. The x-ray detector of claim 16 including an x-ray permeable window sheet disposed proximate the inside surface of said window in electrically insulative relation thereto, said window sheet having a conductive surface confronting said voltage plates and said collector plate elements;
whereby x-ray energy entering said housing through said window in the presence of an electric field between said window sheet conductive surface and said collector plate elements excites the portion of said liquefied noble gas proximate to said window to initiate current conduction by transport of holes and electrons between said window sheet and the most proximate of said collector plate elements.

18. The x-ray detector of claim 16 including means attached to each of said collector plate elements for making electrical connection to a signal processing circuit, said voltage plates and said collector plate elements being comprised of tungsten.

19. The x-ray detector of claim 18 wherein said collector plate elements extend approximately 100 mils into said liquefied noble gas and wherein said voltage plates extend approximately 110 mils into said liquefied noble gas.

20. A high efficiency, computerized tomography x-ray detector, comprising:
a housing having an x-ray permeable window therein;
a plurality of voltage plates, each in the form of a sheet of electrically conductive material and being substantially opaque to x-ray energy;
a plurality of collector plates comprised of nonconductive material, each of said collector plates including an array of side-by-side discrete, electrically conductive collector plate elements, respectively, on each surface thereof in facing relation with adjacent ones, respectively, of said voltage plates, said elements being substantially opaque to x-ray energy;
said voltage plates and said collector plates being positioned perpendicular to said window and in alternating relationship; and
a liquefied noble gas contained within said housing, said liquefied noble gas being substantially opaque to electromagnetic radiation at x-ray frequencies;
whereby x-ray energy entering said housing through said window passes between said voltage plates and said collector plate elements.

21. A high efficiency, computerized tomography x-ray detector, comprising:
a housing having an x-ray permeable window therein;
one voltage plate in the form of a sheet of electrically conductive material;
a collector plate comprising a sheet of nonconductive material and a plurality of side-by-side electrically conductive collector stripes disposed thereon;
said voltage plate and said collector plate mounted in opposed, spaced relation within said housing;
means attached to each of said collector stripes for making electrical connection to a signal processing circuit; and
a liquefied noble gas contained within said housing, said liquefied noble gas being substantially opaque to electromagnetic radiation at x-ray frequencies;
whereby x-ray energy entering said housing through said window in the presence of an electric field between said voltage plate and said collector stripes excites said liquefied noble gas to achieve current conduction by transport of holes and electrons between said voltage plate and the most proximate of said collector stripes.

22. The x-ray detector of claim 21 wherein said liquefied noble gas consists essentially of xenon.

23. The x-ray detector of claim 22 wherein said liquefied xenon density is between 1.1 and 3.5 grams per cubic centimeter.

24. The x-ray detector of claim 21 wherein:
said voltage plate and said collector plate are substantially parallel to one another; and
said voltage plate and said collector plate are mounted such that an x-ray energy beam penetrating said housing window passes between said plates.

25. The x-ray detector of claim 24 which further includes an x-ray permeable window sheet disposed proximate the inside surface of said window in electrically insulative relation thereto, said window sheet having a conductive surface confronting said voltage and collector plates;
whereby x-ray energy entering said housing through said window in the presence of an electric field between said window sheet conductive surface and said collector stripes excites the portion of said liquefied noble gas proximate said window to achieve current conduction by transport of holes and electrons between said window sheet and the most proximate of said collector stripes.

26. The x-ray detector of claim 24 wherein said detector includes a second voltage plate mounted in spaced relation to said one voltage plate;
said collector plate being disposed between said voltage plates;
said collector stripes being disposed on the opposite surfaces of said nonconductive sheet in facing relation with said voltage plates.

27. The x-ray detector of claim 21 wherein said one voltage plate is disposed on the surface of said window facing into said housing, and said collector plate is mounted substantially parallel to said one voltage plate, said voltage and collector plates being comprised of materials substantially transparent to x-ray energy.

28. The x-ray detector of claim 27 wherein said one voltage plate includes an electrically insulating layer disposed on said sheet of electrically conductive material, said voltage plate being positioned such that said electrically insulating layer is in contact with said window surface facing into said housing.

29. The x-ray detector of claim 27 including;
a plurality of additional voltage plates disposed in spaced relation to said window; and
a plurality of additional collector plates positioned with respect to said additional voltage plates to achieve an alternating sequence of respectively spaced said additional voltage plates and said additional collector plates;
each of said additional collector plates comprising a nonconductive sheet and a plurality of nonconductive collector stripes, respectively, disposed on opposite surfaces thereof in facing relation with the adjacent ones, respectively, of said additional voltage plates.

30. The x-ray detector of claim 29 wherein said collector stripes on each of said additional collector plates are respectively arranged in oppositely opposed pairs, said pairs on said additional collector plates being aligned in groups along the trajectory of an x-ray energy beam penetrating said housing window, the pairs in each group being electrically connected together for separate electrical connection to the signal processing circuit.

31. A high efficiency, computerized tomography x-ray detector, comprising:
a housing having an x-ray permeable window therein;
a plurality of voltage plates, each of said voltage plates being in the form of a sheet of electrically conductive material, respectively;
a plurality of collector plates, each of said collector plates comprising a sheet of nonconductive material, respectively, and a plurality of side-by-side electrically conductive collector stripes disposed on said sheet, respectively;
said voltage plates and said collector plates being substantially parallel to one another and positioned to achieve an alternating sequence of respectively spaced said voltage and collector plates such that each said plurality of collector stripes is situated in facing relation, respectively, with the adjacent ones of said voltage plates, respectively;
means attached to each of said collector stripes for making electrical connection to a signal processing circuit; and
a liquefied noble gas contained within said housing, said liquefied noble gas being substantially opaque to electromagnetic radiation at x-ray frequencies;
whereby x-ray energy entering said housing through said window in the presence of an electric field between said voltage plates and said collector stripes passes between said plates and excites said liquefied noble gas to achieve current conduction by transport of holes and electrons between each of said voltage plates, respectively, and the most proximate of said collector stripes, respectively.

32. The x-ray detector of claim 31 wherein said collector stripes disposed on opposite surfaces of each said sheet of nonconductive material are respectively arranged in oppositely opposed pairs, said pairs of said collector plates being aligned in groups, each of said groups lying in a plane substantially perpendicular to said voltage and collector plates, the pairs in each group being electrically connected together for separate electrical connection to the signal processing circuit.

* * * * *